Oct. 23, 1956     F. TURCHAN     2,767,642

SAUSAGE LOAF MOLD

Filed Jan. 25, 1955

INVENTOR.
FRANK TURCHAN
BY
Robert A. Sloman
ATTORNEY

United States Patent Office 2,767,642
Patented Oct. 23, 1956

2,767,642
SAUSAGE LOAF MOLD
Frank Turchan, Dearborn, Mich.

Application January 25, 1955, Serial No. 483,971

1 Claim. (Cl. 99—438)

This invention relates to a sausage loaf mold, and more particularly to an apparatus for baking or cooking a prepared meat mixture and thereafter ejecting the completed loaf therefrom.

Heretofore various types of molds have been employed for this purpose, most of which have resulted in physical damage to the molded article upon manual ejection or removal from the mold.

It is the primary object of the present invention to provide a sausage loaf mold whereby the mixture of meat may be cooked or baked in a loaf form together with means for easily ejecting the cooked loaf from the mold without physical injury thereto.

It is the further object of the present invention to provide a hollow rectangular box in the nature of a sausage loaf mold with a removable cover thereon and incorporating an ejector plate positionable in the bottom of the said container whereby upon removal of the cover and upon transverse movement of the ejector plate, the said sausage loaf or other cooked article may be easily removed without injury to the cooked article and with no waste.

These and other objects will be seen from the following specification and claim in conjunction with the appended drawing, in which:

Figure 1:
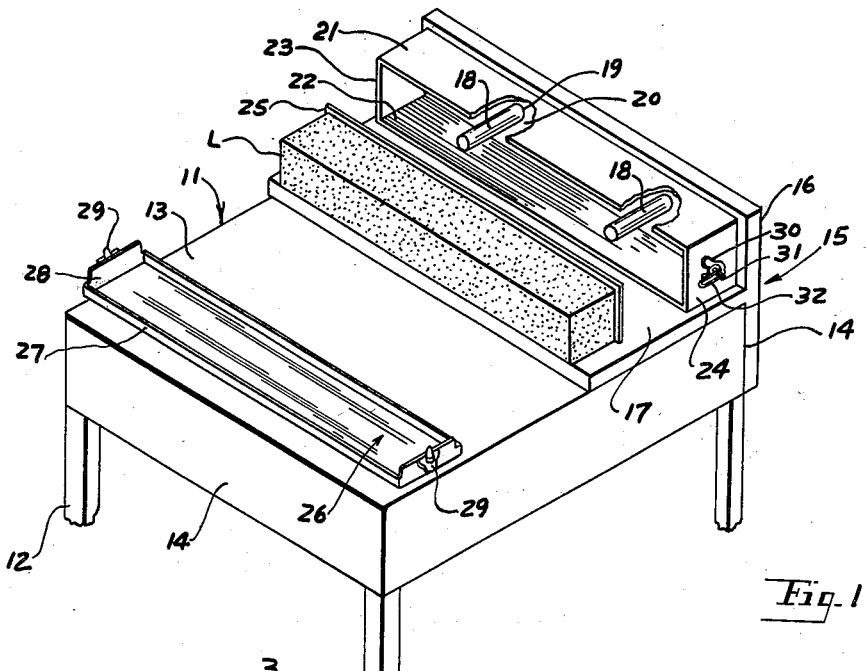
Fig. 1 is a perspective view of the present sausage loaf mold with parts thereof separated and resting upon a table, which is fragmentarily shown.

It will be understood that the above drawing illustrates merely a preferred embodiment of the invention, and that other embodiments are contemplated within the scope of the claim hereafter set forth.

Referring to the drawing, there is provided a table 11 of any construction having a series of legs 12 and a flat rectangular working surface or table top 13 in conjunction with which the present sausage loaf mold is used.

The table top consists of the spaced upright side walls 14, and cooperable with one of said side walls and the said top 13 is an ejector mechanism 15, which is generally of T shape in cross section and includes the upright elongated mounting plate 16 and the right angularly related support plate 17 which is secured on a longitudinal edge thereof to a central portion of mounting plate 16 throughout its length, and intermediate its opposite longitudinal edges.

As shown in Fig. 1, the mounting plate cooperatively engages one upright end wall of the table top and at the same time the support plate 17 bears upon the top surface 13 so that the ejecting mechanism 15 is supportably and retainingly engaged by portions of the said table.

A pair of horizontally disposed parallel spaced ejector pins 18 are secured at their one ends to the upper portion of mounting plate 16 intermediate its ends, said pins extending horizontally over and above support plate 17 as indicated in Fig. 1. There is provided as a part of the present invention a hollow rectangular box which includes the opposed elongated side walls 21 and 22, the bottom wall 20 having a pair of spaced transverse apertures 19 formed therethrough, and the opposed end walls 23 and 24.

Figure 3:
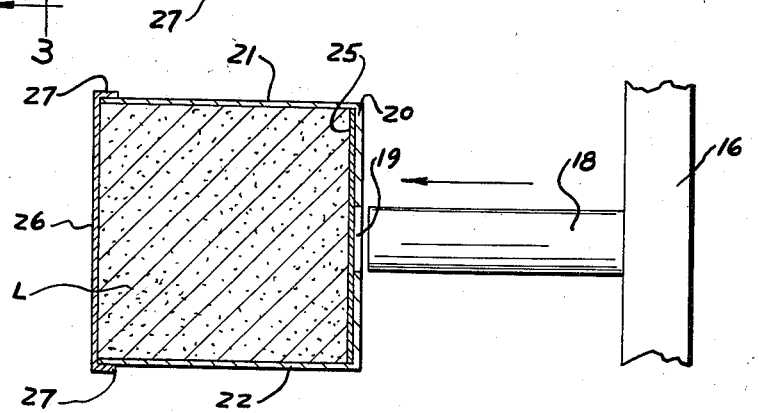
Fig. 3 is a section taken on line 3—3 of Fig. 2 and also illustrating fragmentarily a portion of the ejector pin construction.

There is provided for use in conjunction with said container a rectangularly shaped and elongated ejector plate 25 which corresponds closely to the internal dimensions of said box and is adapted to loosely and slidably be received therein and to engage the bottom wall 20 in parallel relation thereto, as shown in Fig. 3, normally closing transverse apertures 19.

Figure 2:
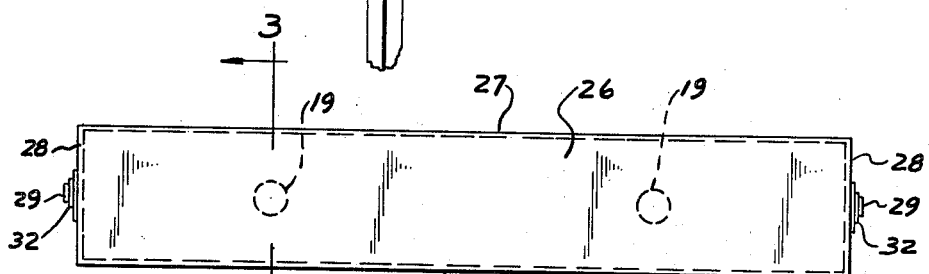
Fig. 2 is a side elevational view of the loaf mold of Fig. 1 with all the parts assembled together.

There is also provided in conjunction with said box a removable cover 26 which includes elongated side flanges 27 and end flanges 28 which cooperatively engage over the marginal portions of the box adjacent its open end, in the manner illustrated in Figs. 2 and 3.

The said cover is suitably secured to the box as by a pair of fasteners. In the preferred embodiment of the invention and for this purpose there are provided a pair of locking elements 29 which project inwardly from opposite ends of the cover 26 and are adapted for cooperative nesting relation within the apertured latches 30 secured to the box end walls 23 and 24, respectively. Locking element 31 is pivotally secured to each latch and has joined thereto the locking clasp 32 which engages around a portion of the locking projection 29 for securing the cover in position upon tilting movement of the locking elements 31.

In operation with the box placed in an upright position upon any support, the ejector plate is first mounted upon the bottom wall thereof, after which the meat mixture or other material to be cooked or baked into the loaf is introduced into the box and the cover closed and secured.

After cooking or baking the container is laid upon one of the side walls, such as side wall 22, upon the support plate 17 on table 11 and the cover 26 is removed therefrom.

The entire box is then slidably moved over the surface of support plate 17 until the pins 18 register with transverse openings 19 in box bottom wall 20. Upon further relative movement of the said box towards the mounting plate 16, the pins 18 will cooperatively slide through apertures 19 and operatively engage ejector plate 25 at spaced points throughout its length, and centrally thereof to thereby forcefully and gradually eject the cooked and formed sausage or other loaf L in the form indicated in Fig. 1.

By this construction there is provided a simple method of ejecting the cooked sausage or other meat mixture mold so that the same retains a perfect cubicle shape with no physical injury thereto and with no wastage.

Having described my invention, reference should now be had to the claim which follows for determinig the scope thereof.

I claim:

In combination, a T shaped support, including a horizontally disposed support plate and an upright mounting plate adapted for positioning over and against the top edge of a table, a pair of parallel spaced horizontal ejector pins secured to the said mounting plate and extending over said support plate, a hollow rectangular mold box resting upon its side upon said support plate and having a bottom wall with a pair of spaced apertures formed therethrough and registerable with said pins, a rectangular ejector plate loosely mounted within said box in parallel engaging relation with said bottom wall, and a cover mounted over the open end of said box and removably secured thereto for retaining therein a meat mixture which has been cooked into a loaf, said box on removal of its cover being slidable over said support plate towards said mounting plate with said pins operatively projecting through said apertures for effecting a lateral removal from said box of said ejector plate and the baked loaf.

References Cited in the file of this patent

UNITED STATES PATENTS

| | | |
|---|---|---|
| 841,136 | Fisher | Jan. 15, 1907 |
| 896,964 | Williams | Aug. 25, 1908 |
| 1,659,615 | Schutzman | Feb. 21, 1928 |
| 1,680,816 | Spaulding | Aug. 14, 1928 |
| 1,749,178 | Berg | Mar. 4, 1930 |
| 2,082,571 | Dornin | June 1, 1937 |
| 2,085,212 | Dornin | June 29, 1937 |